(12) United States Patent
Walthelm et al.

(10) Patent No.: US 11,279,597 B2
(45) Date of Patent: Mar. 22, 2022

(54) RELIABLE DETECTION OF CONTAINER CRANE AND HARNESS (71) Applicant: SIEMENS AKTIENGESELLSCHAFT, Munich (DE)

(72) Inventors: Axel Walthelm, Buckenhof (DE); Fabricio De Carvalho Ferreira, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/290,609

(22) PCT Filed: Oct. 28, 2019

(86) PCT No.: PCT/EP2019/079333
§ 371 (c)(1),
(2) Date: Apr. 30, 2021

(87) PCT Pub. No.: WO2020/099104
PCT Pub. Date: May 22, 2020

(65) Prior Publication Data
US 2022/0002117 A1 Jan. 6, 2022

(30) Foreign Application Priority Data
Nov. 15, 2018 (EP) .................... 18206471

(51) Int. Cl.
B66C 13/48 (2006.01)
B66C 19/00 (2006.01)
(Continued)

(52) U.S. Cl.
CPC ............ B66C 13/48 (2013.01); B66C 19/002 (2013.01); G06T 7/0004 (2013.01); G06T 7/521 (2017.01);
(Continued)

(58) Field of Classification Search
CPC ....... B66C 13/18; B66C 13/48; B66C 19/002; B66C 19/007
(Continued)

(56) References Cited

U.S. PATENT DOCUMENTS

2003/0113020 A1* 6/2003 Tu ...................... G06K 9/00201
382/190
2014/0307941 A1* 10/2014 Zanella ............... G01M 17/027
382/141
(Continued)

FOREIGN PATENT DOCUMENTS

| DE | 102 02 399 A1 | 8/2003 |
| EP | 2724972 A1 | 4/2014 |
| EP | 3 275 831 A1 | 1/2018 |

OTHER PUBLICATIONS

PCT International Search Report and Written Opinion of International Searching Authority dated Jan. 13, 2020 corresponding to PCT International Application No. PCT/ EP2019/079333 filed Oct. 28, 2019.

*Primary Examiner* — Geoffrey E Summers
(74) *Attorney, Agent, or Firm* — Henry M. Feiereisen LLC (57) ABSTRACT A container crane has a trolley movable on a cross-member of a gantry. A harness for picking up and setting down a container and at least one laser scanner are arranged on the trolley. The laser scanner captures a depth image which, as a function of a first and a second angle, indicates the distance of object points detected by a laser beam. The captured depth image is evaluated. Based on the object points, objects are detected and their locations are determined. The objects comprise the harness and/or a container picked up by the harness, and further objects. Based on the detected object points, the contour of the harness and/or of the container picked up by the harness is determined. Detection of further (Continued)

objects within regions defined by the contour is suppressed. A control device takes the detected objects and their locations into account for controlling the container crane.

15 Claims, 8 Drawing Sheets

(51) Int. Cl.
*G06T 7/521* (2017.01)
*G06T 7/70* (2017.01)
*G06T 7/00* (2017.01)
*G06T 7/64* (2017.01)

(52) U.S. Cl.
CPC .................. *G06T 7/64* (2017.01); *G06T 7/70* (2017.01); *G06T 2207/10028* (2013.01); *G06T 2207/20036* (2013.01); *G06T 2207/30108* (2013.01)

(58) Field of Classification Search
USPC .................................................. 382/154, 308
See application file for complete search history.

(56) References Cited

U.S. PATENT DOCUMENTS

2017/0178333 A1* 6/2017 Zhang .................. G06Q 10/083
2018/0282132 A1* 10/2018 Laitasalmi .............. G06T 7/344

* cited by examiner

RELIABLE DETECTION OF CONTAINER CRANE AND HARNESS

CROSS-REFERENCES TO RELATED APPLICATIONS

This application is the U.S. National Stage of International Application No. PCT/EP2019/079333, filed Oct. 28, 2019, which designated the United States and has been published as International Publication No. WO 2020/099104 A1 and which claims the priority of European Patent Application, Serial No. 18206471.7, filed Nov. 15, 2018, pursuant to 35 U.S.C. 119(a)-(d).

BACKGROUND OF THE INVENTION

The present invention is based on an operating method for a container crane, wherein the container crane has a trolley which can be moved on a cross-member of a gantry of the container crane, wherein a harness for picking up and setting down a container is arranged on the trolley, wherein at least one laser scanner is arranged on the trolley,
  wherein by means of the laser scanner a depth image is captured which, as a function of a first and a second angle, in each case indicates the distance of object points detected by the laser scanner by means of a laser beam,
  wherein the captured depth image is evaluated by means of an evaluation facility such that, based on the object points, objects are detected, and the locations thereof are determined,
  wherein the objects comprise the harness and/or a container picked up by the harness and further objects,
  wherein based on the captured object points, the contour of the harness and/or the container picked up by the harness is determined and
  wherein a control facility of the container crane takes the detected objects and the locations thereof into account in the context of controlling the container crane.

The present invention is also based on a container crane, wherein the container crane has a trolley which can be moved on a cross-member of a gantry of the container crane,
  wherein a harness for picking up and setting down a container is arranged on the trolley,
  wherein at least one laser scanner is arranged on the trolley by means of which a depth image can be captured which, as a function of a first and a second angle, in each case indicates the distance of object points detected by the laser scanner by means of a laser beam,
  wherein the container crane has an evaluation facility by which the captured depth image is evaluated such that, based on the object points, objects are detected, and the locations thereof are determined,
  wherein the objects comprise the harness and/or a container picked up by the harness and further objects,
  wherein the evaluation facility is designed such that, based on the captured object points, it determines the contour of the harness and/or the container picked up by the harness, and
  wherein the container crane has a control facility which takes the detected objects and the locations thereof into account in the context of controlling the container crane.

Container cranes can, for example, be designed as gantry cranes or as container bridges. They can be operated manually or in a partially automated or fully automated manner. Laser scanners are frequently used for the fully automated or partially automated picking up and setting down of containers by gantry cranes. By means of the laser scanner, the respective harness, where this exists, the respective container and the areas in particular beneath the harness and the container are captured and evaluated from the side. As a result, obstacles which are located beneath the harness and the container in particular can be detected in a timely manner.

Due to the typical geometry of gantry cranes, it is necessary to arrange the laser scanner relatively close to the trolley. As a result, the laser scanner "sees" the container and the harness. In many cases, the evaluation of the captured depth image works correctly. In some cases, however, reflections occur with a high frequency, in particular on the walls of the container picked up by the harness. The problem arises particularly in wet conditions and in the case of gloss painting of the container. Such reflections lead to incorrect distance measurements. Such distance measurements can lead to an—incorrect—evaluation to the effect that an obstacle is suspected under the harness and under the container, although the obstacle is not present at all. The correction of such incorrect measurements and evaluations is often not possible in an automated manner in the prior art. In order to avoid accidents and damage, the automated operation—in particular, the automated setting down of a container—is therefore often interrupted. In this case, setting down of the container must be manually controlled by an operator. The operator must explicitly give permission to continue the automated operation of the container crane at least.

The object of the present invention is to provide possibilities on the basis of which, despite the occurrence of reflections, the correct detection of obstacles is possible at least as a general rule. In particular, reflections which incorrectly lead to the detection of an apparent obstacle under the harness or the container—that is to say, an obstacle which is not actually present—are to be avoided as far as possible.

SUMMARY OF THE INVENTION

The object is achieved by an operating method as set forth hereinafter. Advantageous embodiments of the operating method are the subject of the dependent claims.

According to the invention, an operating method of the aforementioned kind is designed in such a way that detection of the further objects within areas defined by the determined contour is suppressed.

The invention is based on the knowledge that incorrect measurements in the vertical displacement range of the container can only be caused by reflections on the harness or on the container. As a result of the previous localization of the container and the harness, measurements in this range with significantly greater distances than actually expected can therefore be identified as reflections and excluded from further evaluation. In particular, proximity relationships can be used to determine individual "outliers" and disregard them in the further course of events.

The determination of the contour of the harness and/or the container picked up by the harness can be implemented in a particularly simple and efficient manner in that the captured depth image or an image derived therefrom is first subjected to a first mathematical morphological operation such that objects having a size below a first maximum size are filtered out in the captured depth image or the image derived therefrom, and in that the contour of the harness and/or the container picked up by the harness is then determined on the basis of the image subjected to the first morphological operation.

The first mathematical morphological operation can in particular be a morphological dilatation and a morphological erosion following the morphological dilatation. Alternatively, the reverse sequence can also be adopted. In both cases, however, a filter core which is the same size as the filter core used in the context of morphological erosion is used for morphological dilatation. This filter thus acts in the same manner for both morphological partial operations of the first mathematical morphological operation.

In order to suppress the detection of the further objects within the areas defined by the determined contour, the image subjected to the first mathematical morphological operation is preferably subjected to a second mathematical morphological operation such that objects having a size below a second maximum size are filtered out in the image subjected to the first mathematical morphological operation. This procedure leads to very reliable suppression of the corresponding further objects with little computational effort.

The second mathematical morphological operation can be a morphological dilatation and an erosion following the morphological dilatation. Alternatively, it can be morphological erosion and morphological dilatation following morphological erosion. In both cases, however, a filter core of the same size as the filter core used in the context of morphological erosion is used for morphological dilatation. This filter thus acts in the same manner for both morphological partial operations of the second mathematical morphological operation. Furthermore, in the context of the second mathematical morphological operation, the sequence of morphological erosion and morphological dilatation is inverse to the sequence of morphological erosion and morphological dilatation in the context of the first mathematical morphological operation.

The size of the filter cores used in the context of the second mathematical morphological operation may in individual cases be identical to the size of the filter cores used in the context of the first mathematical morphological operation. As a rule, however, the sizes are different from one another. In particular, the filter cores used in the context of the second mathematical morphological operation can be of a larger size than the filter cores used in the context of the first mathematical morphological operation.

The operating method according to the invention is very robust. In particular, it can therefore also be performed while it is raining or snowing in the vicinity of the container crane.

The object is furthermore achieved by a container crane as set forth hereinafter. Advantageous embodiments of the container crane are subject of the dependent claims.

According to the invention, a container crane of the aforementioned kind is designed in such a way that the evaluation facility is designed such that it suppresses the detection of the further objects within areas defined by the determined contour.

The resulting advantages correspond to those of the operating method.

The advantageous embodiments of the container crane correspond to those of the operating method. The advantages achieved thereby are also the same.

BRIEF DESCRIPTION OF THE DRAWING

The properties, features, and advantages of this invention described above and the manner in which they are achieved will become clearer and more clearly understood in connection with the following description of the exemplary embodiments which are explained in more detail in connection with the drawings. The drawings show a diagrammatic view of:

FIG. 1 A container crane,
FIG. 2 The container crane of FIG. 1 from the side,
FIG. 3 A detection zone of a depth image,
FIG. 4 A depth image,
FIG. 5 A possible line of the depth image of FIG. 4,
FIG. 6 A possible column of the depth image of FIG. 4,
FIG. 7 The container crane of FIG. 1 in connection with a reflection,
FIG. 8 A control structure of the container crane,
FIG. 9 A flowchart,
FIG. 10 to 14 In each case, a course of a first angle as a function of a second angle,
FIG. 15 A flowchart,
FIG. 16 to 20 Modified depth images.

DETAILED DESCRIPTION OF PREFERRED EMBODIMENTS

Figure 1:
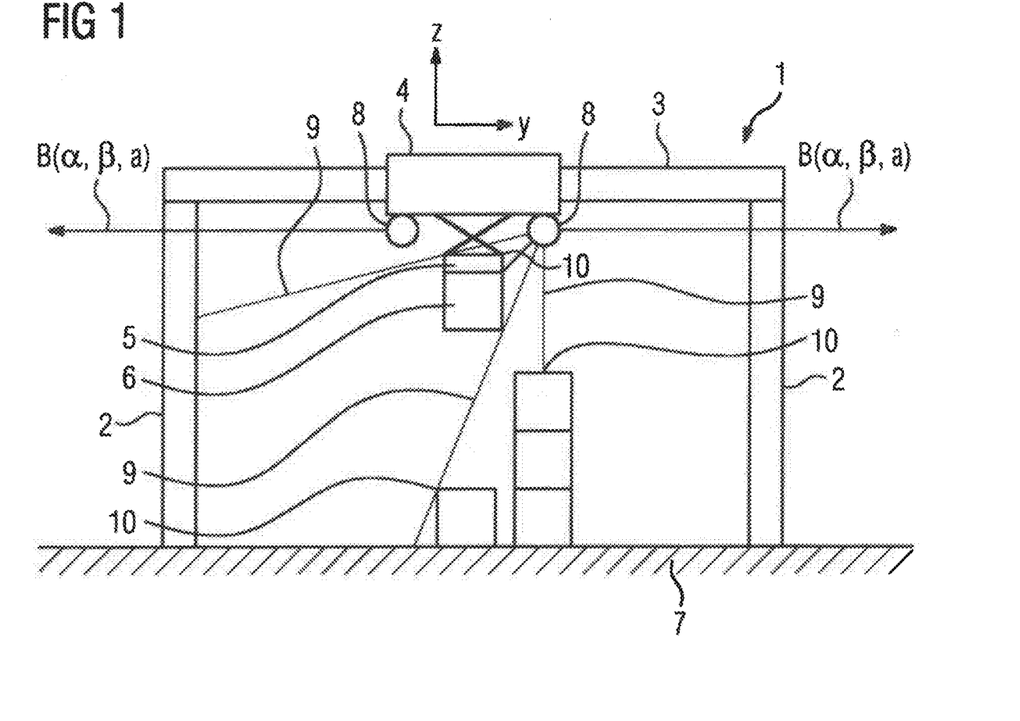
Figure 2:
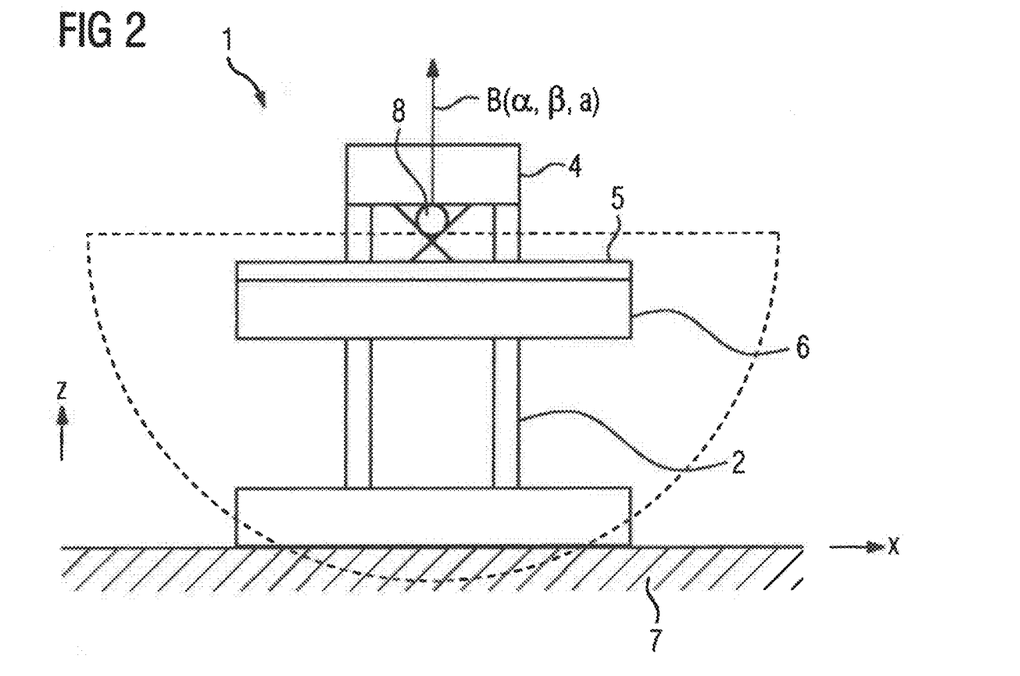

According to FIGS. 1 and 2, a container crane has a gantry 1. The gantry 1 has two supports 2 which are connected to one another via a cross-member 3. The container crane can be designed as a container bridge or other gantry crane. The supports 1 can be moved in a direction of travel x of the container crane. The direction x is referred to hereinafter as gantry direction x because in it the container crane is moved as a whole. A trolley 4 of the container crane can be moved on the cross-member 3. The direction in which the trolley 4 can be moved is referred to hereinafter as the trolley direction and is provided with the reference character y. The trolley direction y is orthogonal to the gantry direction x. Both the gantry direction x and the trolley direction y are horizontally oriented as a rule.

A harness 5 is arranged on the trolley 4. The harness 5 is used for picking up and setting down a container 6. In particular, the harness 5 can comprise a so-called spreader and the associated cable for raising and lowering the spreader. The harness 5 can be raised and lowered in the vertical direction z relative to the ground 7 on which the container crane can be moved as a whole. This applies regardless of whether or not a container 6 is picked up by the harness 5 and consequently the container 6 is raised or lowered with it.

At least one laser scanner 8 is arranged on the trolley 4. As a rule, two laser scanners 8 are present as shown in FIGS. 1 and 2. In particular, the two laser scanners 8 are generally arranged in such a way that the harness 5 and, if necessary, the container 6 are located between the two laser scanners 8, as seen in the trolley direction y and that, furthermore, as seen in the gantry direction x, the two laser scanners 8 are located approximately in the center of the cross-member 3. However, Images B captured by means of the laser scanner 8 are evaluated independently of one another. Therefore, only the operation of one of the laser scanners 8 is explained in more detail hereinafter, namely the operation of the laser scanner 8 on the right in FIG. 1. The operation of the other laser scanner 8 takes place in an analogous manner.

The laser scanner 8 operates in such a way that a laser beam 9 emitted by the laser scanner 8 is in each case pivoted over an angular range of a second angle $\beta$ in the case of a multiplicity of values of a first angle $\alpha$. During pivoting over the second angle $\beta$, in the case of a multiplicity of values of the second angle $\beta$, for example, the propagation time between the emission of the laser beam 9 and the reception of the reflected laser beam can be detected, and the distance of a respectively captured object point 10 can be determined therefrom in conjunction with the known light velocity. This procedure is well known to those skilled in the art. However, other possibilities generally known to those skilled in the art are also applicable for determining the distance.

The first angle $\alpha$ is preferably located in the yz plane. Thus, it is essentially a polar angle. If the vertical is designated by 0°, positive values of the angle $\alpha$ are directed towards the container 6 and negative values of the angle $\alpha$ accordingly face away from the container 6, the angular range covered by the first angle $\alpha$, corresponding to the illustration in FIG. 1, preferably extends from a value slightly below 0°—for example, −5° or −10°—to a value significantly above 0°—for example, 45° or 60°. The second angle $\beta$ extends in such a way that the angular range covered by it intersects the yz plane orthogonally. As a rule, this angular range extends, as shown in FIG. 2, symmetrically to the yz plane over a semicircle or almost a semicircle. If the laser beam 9 is located in the yz plane for a value of the second angle $\beta$ of 0°, this angular range can extend, for example, from −90° to +90° or from −80° to +80°. However, embodiments are also possible in which the second angle $\beta$ covers an angular range which is significantly smaller than 180° or vice versa is even greater than 180°.

Figure 3:
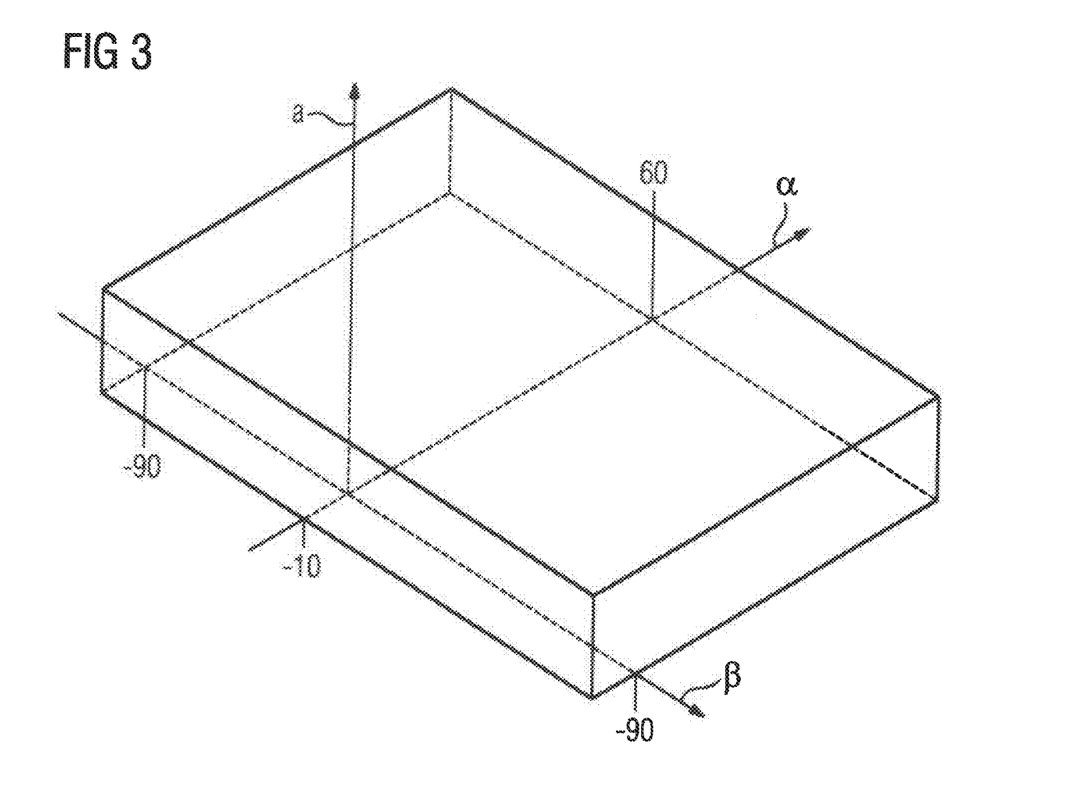
Figure 4:
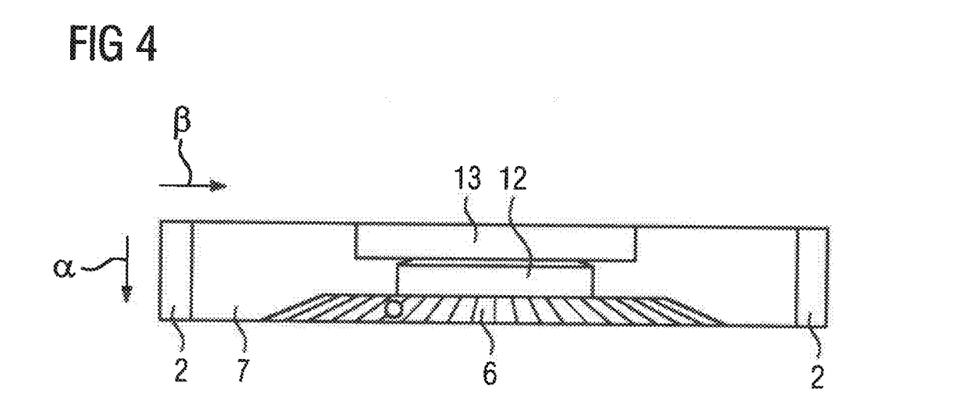
Figure 5:
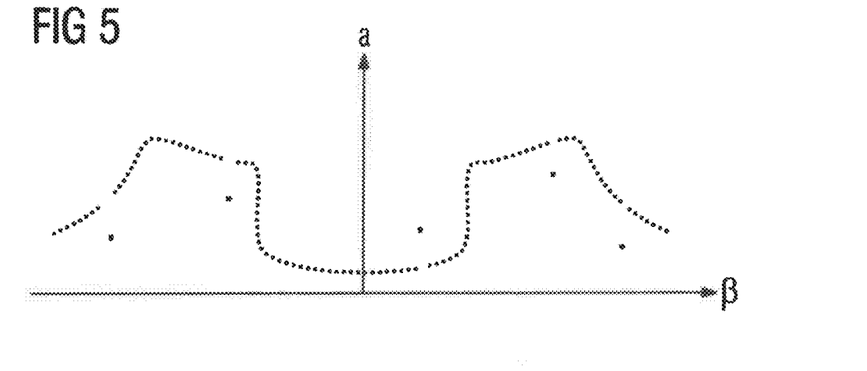
Figure 6:
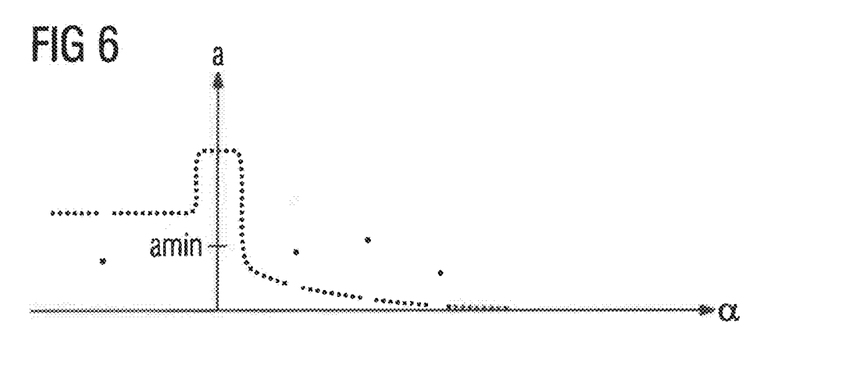
Figure 7:
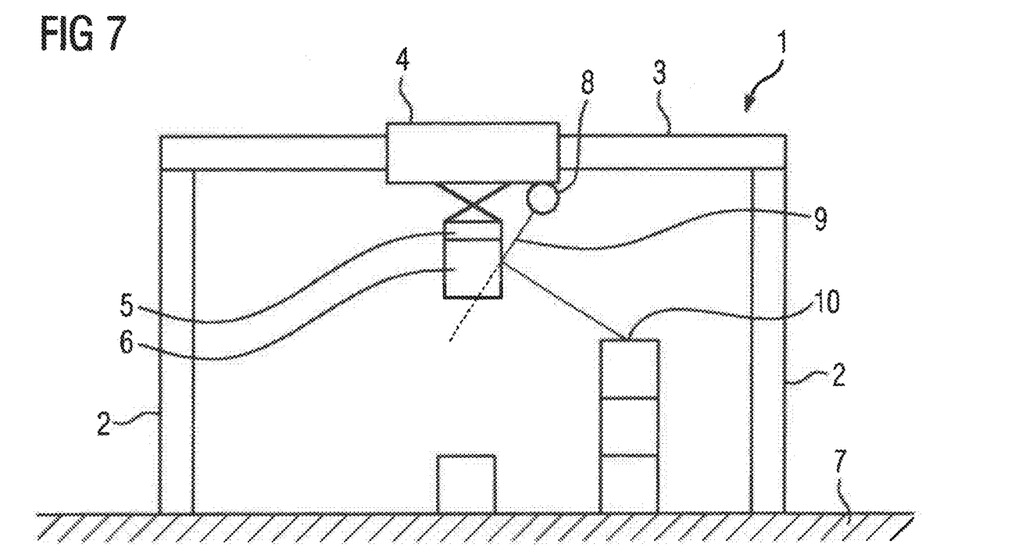

Due to the fact that the information about the distance a of the respectively captured object point 10 is also contained in the respective image B captured by means of the laser scanner 8, the respective image B is a depth image. Thus, in accordance with the illustration in FIG. 3 to 6, the depth image B indicates the distance a of the captured object points 10 from the laser scanner 8 for the first and the second angle $\alpha$, $\beta$ in each case. FIG. 3 shows diagrammatically the detection range of the first angle $\alpha$ and the detection range of the second angle $\beta$ for a (purely theoretically uniform) distance a. Although the numerical values indicated in FIG. 3 are in typical ranges of values, they are purely exemplary and only for illustrative purposes. FIG. 4 shows a possible depth image B. FIG. 5 shows a possible course of the distance a for a line of the depth image B of FIG. 4, that is to say the distance a as a function of the second angle $\beta$ for a certain first angle $\alpha$ held constant. FIG. 6 shows, conversely, a possible course of the distance a for a column of the depth image B of FIG. 4, that is to say, the distance a as a function of the first angle $\alpha$ for a certain second angle $\beta$ held constant. It can be seen in particular from FIGS. 5 and 6 that the spatial resolution in the angles $\alpha$ and $\beta$ is high. For example, scanning can take place at both angles $\alpha$, $\beta$ with an increment of 1°. However, the increment mentioned can also have a different value, for example, 0.1°, 0.2° or 0.5°. Furthermore, it can also have different values for the first and the second angle $\alpha$, $\beta$. It can furthermore be seen from the illustrations of FIGS. 5 and 6 that the detection of the distances a is not ideal, but that every now and then "outliers" occur both upwards and downwards, that is to say both at greater as well as at smaller distances a. The "outliers" at smaller distances can be caused, for example, by raindrops or snowflakes. The "outliers" at greater distances can be caused in particular by reflections on the harness 5 and on the container 6. An example of such a reflection is shown in FIG. 7. In FIG. 7, dashed lines also show the location at which, In this case in the prior art, an object which is not actually present would be incorrectly detected.

Figure 8:
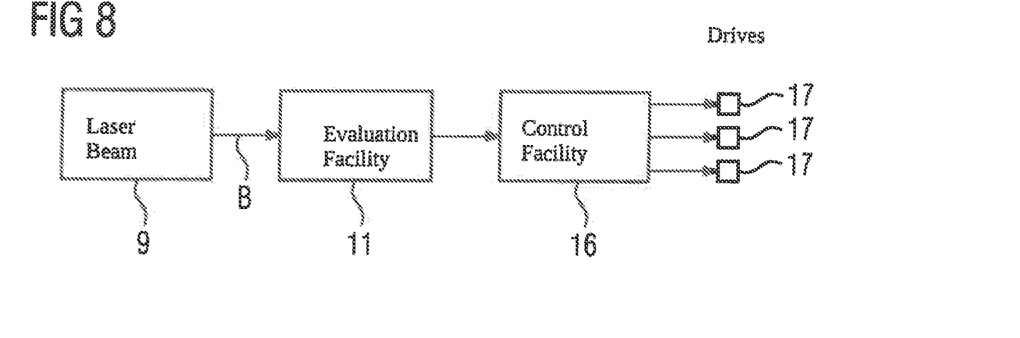

According to FIG. 8, the captured depth image B is supplied by the laser scanner 8 to an evaluation facility 11.

The evaluation facility 11 evaluates the depth image B. In particular, the evaluation facility 11 recognizes objects based on the object points 10 and determines the locations thereof. For example, the evaluation facility 11—see FIG. 1—can detect the container 12 directly below the trolley 4 and determine its location. The evaluation facility 11 can also detect the container 13 and determine its location, which is on the side of the laser scanner 8 next to this container 12. It is also possible to detect other objects—for example, the ground 7. Above all, however, the evaluation facility 11 can detect the container 6 and the harness 5. In the context of the evaluation of the depth image B, the evaluation facility 11 can in particular take into account that it knows in advance on which side of the depth image B (namely at high values of the first angle $\alpha$) the harness 5 and the container 6 must be located.

The corresponding procedures for detecting the various objects are known per se. They therefore need not be explained in detail. In the present case, however, the manner in which the contour of the harness 5 and/or of the container 6 picked up by the harness 5 is determined with regard to the captured object points 10, and the manner in which incorrect determinations of objects are eliminated is important.

In particular, the evaluation facility 11 operates in accordance with the illustration in FIG. 9 as follows:

In a step S1, the evaluation facility 11 receives a depth image B. As aforementioned, the depth image B contains the course of the distance a as a function of the two angles $\alpha$, $\beta$.

In a step S2, the evaluation facility 11 sets the second angle $\theta$ to an initial value $\beta 1$ and thereby selects a column of the depth image B shown in FIG. 4, as it were. The initial value $\beta 1$ can correspond, for example in the illustration of FIG. 4, to the left edge of the depth image B. In a step S3, the evaluation facility 11—valid only for the selected column—determines a first angle $\alpha$. In particular, the evaluation facility 11 searches the selected column of the depth image B for that value of the first angle $\alpha$ at which—preliminarily—the edge of the container 6 is assumed. Step S3 can be implemented, for example, in such a way that, starting from the minimum value of the first angle $\alpha$ to larger values of the first angle $\alpha$, that first angle $\alpha$ is determined at which a distance a is determined for the first time below a predetermined minimum distance amin (see FIG. 6). In the simplest case, the predetermined minimum distance amin is a constant. However, with sufficient knowledge of the system, the predetermined minimum distance amin may also be a variable. Alternatively, it is possible to implement step S3 in such a way that, starting from the minimum value of the first angle $\alpha$ to larger values of the first angle $\alpha$, that first angle $\alpha$ is determined at which a sufficiently large jump from a larger to a smaller distance occurs for the first time. Combinations of these two procedures are also conceivable.

In a step S4, the evaluation facility 11 checks whether the second angle $\beta$ has exceeded a final value $\beta 2$. As long as this is not the case, the evaluation facility 11 proceeds to a step S5 in which the evaluation facility 11 increases the second angle $\alpha$ by an increment $\delta\beta$. The final value $\beta 2$ can, for example, correspond to the right edge of the depth image B there in the illustration of FIG. 4. The increment $\delta\beta$ can in particular match the spatial resolution of the second angle $\beta$. From step S5, the evaluation facility goes back to step S3.

Figure 10:
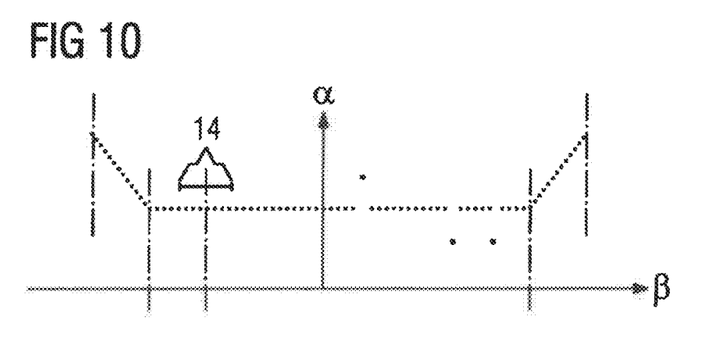

As a result of the repeated execution of step S3 for various values of the second angle $\beta$, a (preliminary) contour line showing the respective value of the first angle $\alpha$ as a function of the second angle $\beta$ is thus gradually determined. FIG. 10 shows an example of a possible preliminary contour line. The values of the second angle $\beta$, at which the end points of the contour line and the two inflection points of the contour line lie, are indicated by vertical dashed lines in FIG. 10. The vertical dashed lines in FIG. 11 to 14 correspond in each case to these values of the second angle β. The further measures for detecting the (final) contour line are based on the determined preliminary contour line. The preliminary contour line now determined is thus an example of an image derived from the captured depth image B.

In order to determine the final contour line and thus also the contour as a result, the evaluation facility 11 subjects the preliminary contour line derived from the captured depth image B to a first mathematical morphological operation M1 in a step S6. By means of the first mathematical morphological operation M1, objects are filtered out in the preliminary contour line derived from the captured depth image B, said objects lying on the one hand outside the angular range covered by the harness 5 and/or the container 6, and on the other hand, having a size below a first minimum size. Theoretically, objects which are within the angular range covered by the harness 5 and/or the container 6 and have a size below a first minimum size can also be filtered out by the procedure of step S6. However, such objects do not occur in practice.

The first mathematical morphological operation M1 can in particular be a so-called opening or a so-called closing. In both cases, the first mathematical morphological operation M1 consists of two partial steps performed one after the other.

Figure 11:
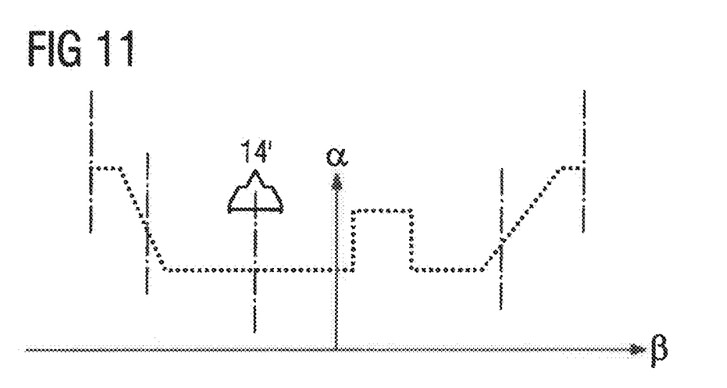

The first partial step is a morphological erosion or a morphological dilatation. For example, in accordance with the illustration in FIG. 10, the maximum value of the first angle α can be used in each case for each value of the second angle β within a first filter core 14 (see FIG. 10) and used for this value of the second angle β as a modified value of the first angle α for the second partial step. The first filter core 14 is usually of a size which is a relatively small multiple of the increment δβ. For example, starting from the respective value of the second angle β, two or three further values can be used for smaller and larger values of the second angle β in addition to the value of the first angle α. FIG. 11 shows, purely by way of example, a possible result after the first partial step of the first mathematical morphological operation M1.

Figure 12:
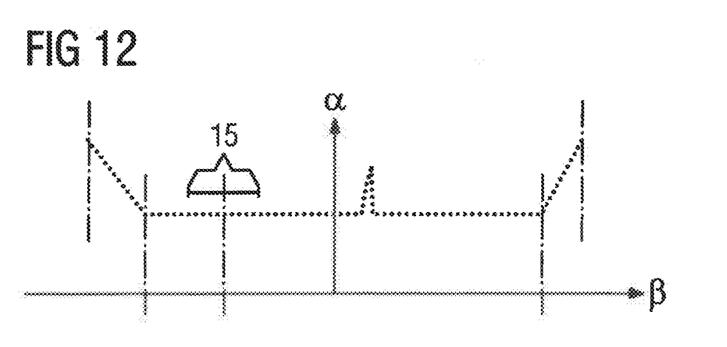

The second partial step is inverse to the first partial step. If the first partial step is a morphological dilatation, the second partial step is a morphological erosion. Conversely, if the first partial step is a morphological erosion, the second partial step is a morphological dilatation. In any case, however, in the context of the second partial step, a filter core 14' having the same size as the filter core 14 in the first partial step is used. FIG. 12 shows, purely by way of example, a possible result after the second partial step of the first mathematical morphological operation M1. Evidently, the first mathematical morphological operation M1 shows a clear smoothing of the preliminary contour line.

Interferences in which the laser beam 9 has been reflected back to the laser scanner 8 at insufficiently small first angles α on small objects—for example, raindrops or snowflakes—are filtered out by means of the first mathematical morphological operation M1. Such interferences are only filtered out up to a first maximum size of the interferences. This size is determined by the size of the first filter cores 14, 14'.

The contour of the harness 5 and the container 6 is thus determined by the approach. The exact contour can now be determined in a conventional manner. Such procedures are well known to people skilled in the art.

On the other hand, the first mathematical morphological operation M1 does not filter out any interferences in which the laser beam 9 has been reflected on the container 6 or on the harness 5 in such a way that it has not been directly reflected back to the laser scanner 8, but only after further reflection or scattering on another object has been reflected back to the laser scanner 8. FIG. 12 shows such a reflection purely by way of example. Such reflections are particularly problematic when they occur in the edge region of the container 6 or the harness 5 and thereby only distort the preliminary contour line to a relatively small extent.

In order to suppress such reflections and thus as a result suppress the detection of further objects within areas defined by the determined contour, the evaluation facility 11 subjects the contour line determined in step S6 to a second mathematical morphological operation M2 in a step S7. The corresponding further objects are suppressed by the second mathematical morphological operation M2.

Figure 13:
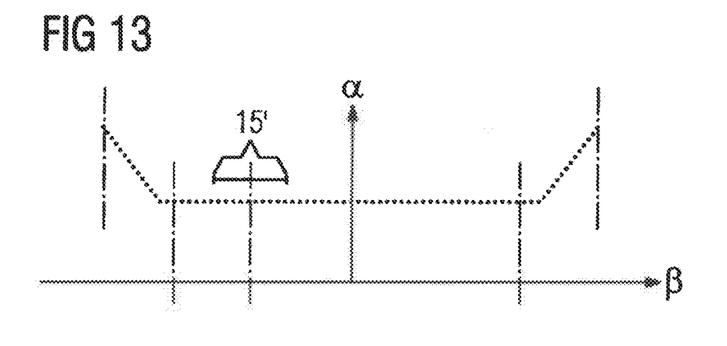
Figure 14:
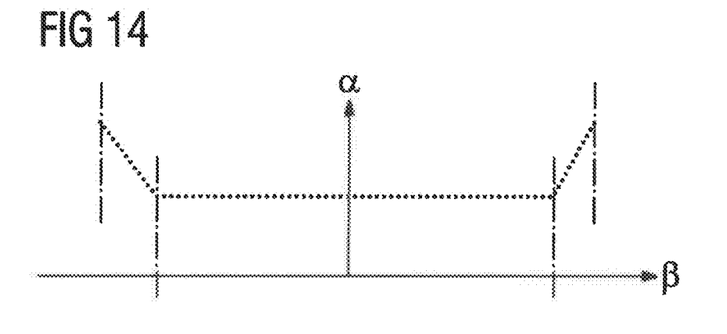

The second mathematical morphological operation M2 can—analogously to the first mathematical morphological operation M1—consist in particular of two partial steps carried out one after the other. In this case—as before with the first mathematical morphological operation M1—the first partial step is a morphological dilatation or a morphological erosion and the second partial step is the inverse operation. In contrast to the first mathematical morphological operation M1, however, second filter cores 15, 15' are used, as shown in FIGS. 12 and 13. Furthermore, the sequence of the two partial steps is inverse to the sequence of the two partial steps of the first mathematical morphological operation M1. Purely by way of example, FIG. 13 shows a possible result after the first partial step of the second mathematical morphological operation M2, and FIG. 14 shows a possible result after the second partial step of the second mathematical morphological operation M2. It can be seen that the second mathematical morphological operation M2 further smooths the preliminary contour line.

The second filter cores 15, 15' are of a uniform size among each other. In Individual cases, they can be the same size as the first filter cores 14, 14'. As a rule, however, the second filter cores 15, 15' are a different size from the first filter cores 14, 14'. In particular, they may be larger than the first filter cores 14, 14'.

The detection of further objects is suppressed within areas defined by the determined contour by means of the second mathematical morphological operation M2. The further objects are suppressed only up to a second maximum size of the further objects. This size is determined by the size of the second filter cores 15, 15'.

The second mathematical morphological operation M2 thus particularly filters out those interferences which border the contour in the depth image B on the container side or inner side and in which the laser beam 9 has been reflected on the container 6 or on the harness 5 in such a way that it has not been reflected directly back to the laser scanner 8 but has been reflected back to the laser scanner 8 only after further reflection or scattering on another object.

Due to the fact that the sequence of erosion and dilatation in the context of the second mathematical morphological operation M2 is inverse to the sequence of erosion and dilatation in the context of the first mathematical morphological operation M1, the second mathematical morphological operation M2 consequently acts only within the contour determined in the context of the first mathematical morphological operation M1. At least generally speaking, the result thus now particularly does not contain any incorrectly detected apparent objects which can only have arisen due to reflections on the container 6 or on the harness 5.

The evaluation facility 11 transmits its results in a step S8 to a control facility 16 of the container crane. The control facility 16 is thus able, as shown in FIG. 8, to take this information into account in the context of the control of the container crane—in particular in the context of the control of drives 17 of the container crane. By means of the drives 17, in particular the container crane is moved as a whole in the gantry direction x, the trolley 4 is moved on the crossmember 3 in the trolley direction y and the harness 5 (with or without the container 6) is picked up and put down vertically.

The manner of evaluating the depth image B discussed above in connection with FIG. 9 to 14 is not the only one possible. Purely by way of example, a further manner of evaluating the depth image B is explained below in connection with FIG. 15 to 20.

Figure 15:
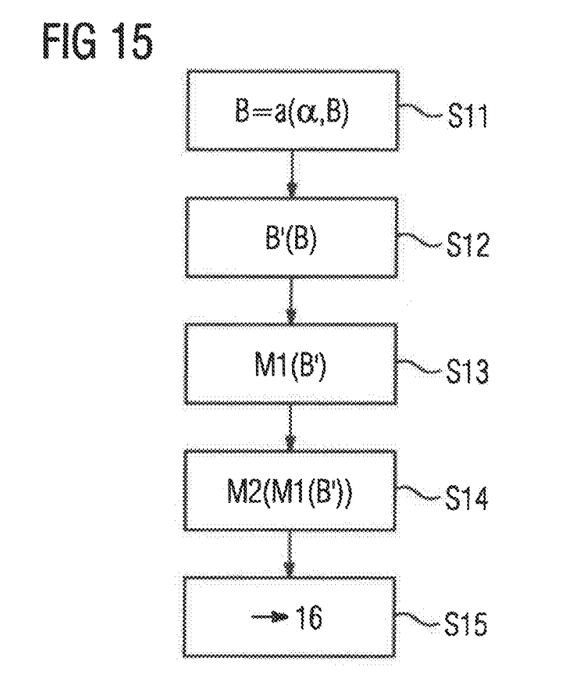

According to FIG. 15, the evaluation facility 11 receives a depth image B in a step S11. Step S11 corresponds to step S1 of FIG. 9.

In a step S12, the evaluation facility 11 determines those angle pairs α, β of the depth image B in which the respectively determined distance a lies below a predetermined minimum distance amin. For these angle pairs α, β, the value 0 is set, for the other angle pairs α, β the value 1. The depth image B is thus binarized. With respect to the minimum distance amin, the above embodiments made in connection with step S3 of FIG. 9 are similarly applicable. The image B' now determined is a further example of an image derived from the captured depth image B.

Figure 16:
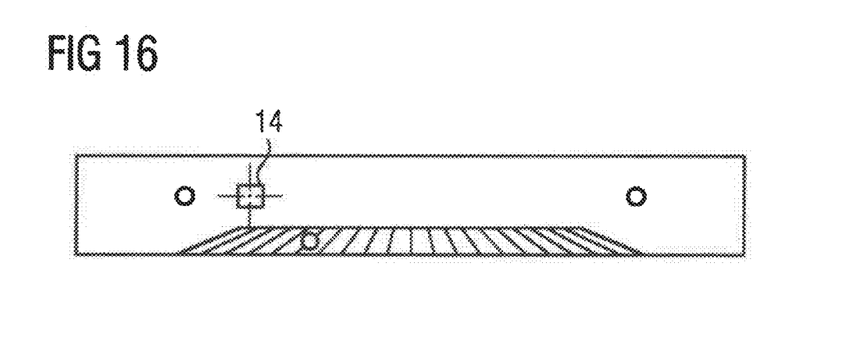

FIG. 16 shows a possible binarized image B' purely by way of example. Those areas which are set to 0 are shown shaded in FIG. 16.

In a step S13, the evaluation facility 11 subjects the image B' to a first mathematical morphological operation M1. The first mathematical morphological operation M1 filters out objects in the image B', the distance a of which is above the predetermined minimum value and which furthermore have a size below a first minimum size. The first mathematical morphological operation M1 can in particular consist of two partial steps carried out one after the other.

Figure 9:
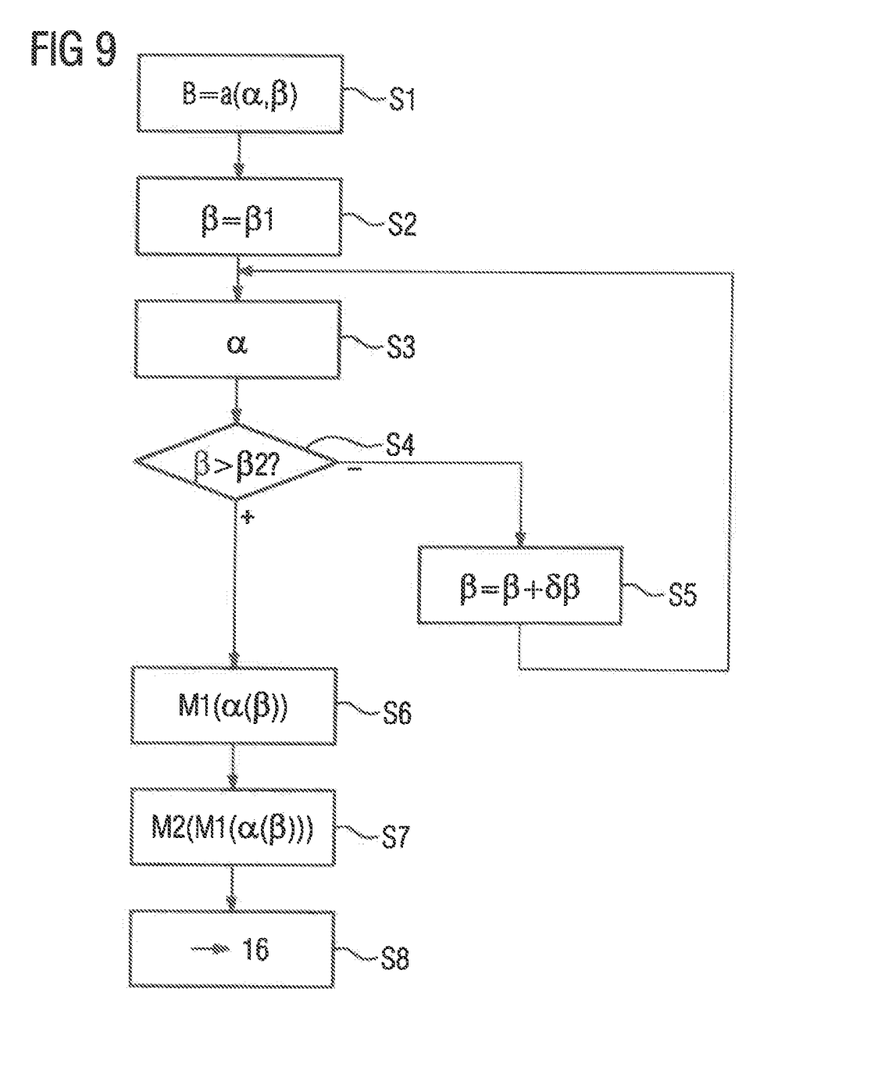
Figure 17:
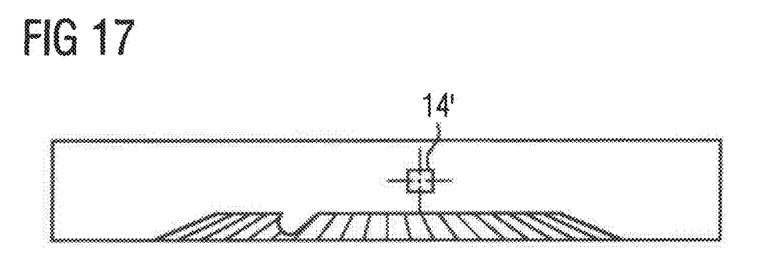

As with step S6 of FIG. 9, the first partial step is a morphological dilatation or a morphological erosion. For example, for each value pair, the angle α, β of the value can be set to 1 If the value 1 occurs at least once within a first filter core 14 around this value pair. Otherwise, the value 0 is maintained. This modified value is used as the value for the second partial step. FIG. 17 shows a possible result of the first partial step purely by way of example.

The first filter core 14 is usually relatively small in size. For example, starting from the respective value pair of the angles α, β—for smaller and larger values of the first angle α and the second angle β, in addition two or three further values can be added for the first angle α and/or the second angle β. However, as a rule, the first filter core 14—in contrast to the procedure according to FIG. 9, in which the first filter core 14 is always one-dimensional—is two-dimensional. In individual cases, however, the first filter core 14 can also be one-dimensional in the context of the procedure of FIG. 15.

Figure 18:
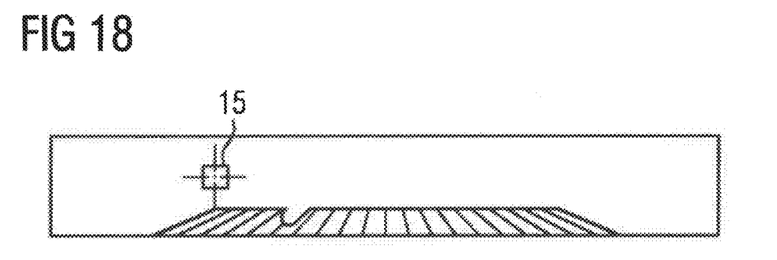

The second partial step is again inverse to the first partial step. If the first partial step is a morphological dilatation, the second partial step is a morphological erosion. Conversely, if the first partial step is a morphological erosion, the second partial step is a morphological dilatation. If, for example, in the first partial step for each value pair of the angles α, β, the value has been set to 1 If the value 1 occurred at least once within a first filter core 14 around this value pair, the value is now set to 0 for each value pair of the angles α, β if the value 0 occurs at least once within a filter core 14' around this value pair. Otherwise, the value 1 is maintained. In any case, however, a filter core 14', which is the same size as the filter core 14 in the first partial step, is used in the context of the second partial step. FIG. 18 shows, purely by way of example, a possible result after the second partial step of the first mathematical morphological operation M1. It can be seen—just as in the procedure according to FIG. 9—that the first mathematical morphological operation M1 results in clear smoothing.

Interferences are filtered out by means of the first mathematical morphological operation M1 in which the laser beam 9 has been reflected back to the laser scanner 8 on small objects—for example, raindrops or snowflakes. However, the filtering out of such interferences takes place only up to a first maximum size of the interferences. As before in the procedure of FIG. 9, this size is determined by the size of the first filter cores 14, 14'.

The contour of the harness 5 and the container 6 is thus determined by the approach. The exact contour can be determined as before. Such procedures are well known to those skilled in the art.

Conversely, as before, by means of the first mathematical morphological operation M1 no interferences are filtered out in which the laser beam 9 has been reflected on the container 6 or on the harness 5 in such a way that it has not been reflected directly back to the laser scanner 8 but has been reflected back to the laser scanner 8 only after further reflection or scattering on another object.

In order to suppress such reflections and thus as a result of suppression of the detection of further objects within areas defined by the determined contour, the evaluation facility 11 subjects the image determined in step S13 to a second mathematical morphological operation M2 in a step S14. The corresponding further objects are suppressed by the second mathematical morphological operation M2.

Figure 19:
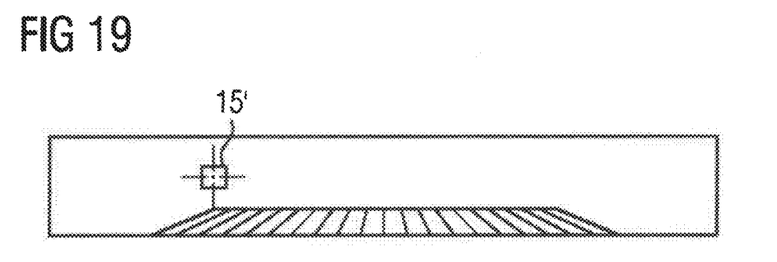
Figure 20:
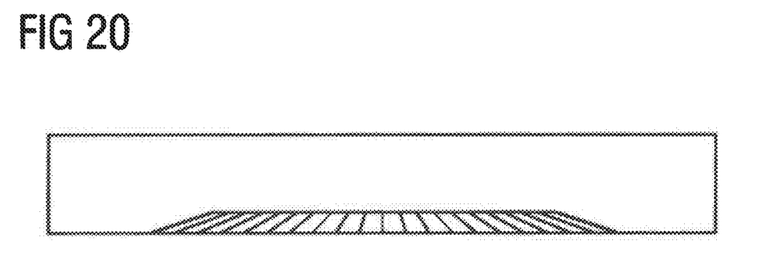

The second mathematical morphological operation M2 can—analogously to the first mathematical morphological operation M1—consist in particular of two partial steps carried out one after the other. In this case—as before in the case of the first mathematical morphological operation M1—the first partial step is a morphological dilatation or a morphological erosion and the second partial step is the inverse operation. Unlike the first mathematical morphological operation M1, however, second filter cores 15, 15' are used as shown in FIGS. 18 and 19. Furthermore, the sequence of the two partial steps is inverse to the sequence of the two partial steps of the first mathematical morphological operation M1. FIG. 19 shows, purely by way of example, a possible result after the first partial step of the second mathematical morphological operation M2, and FIG. 20 shows a possible result after the second partial step of the second mathematical morphological operation M2. It can be seen that the second mathematical morphological operation M2 performs further smoothing.

The second filter cores 15, 15' are of a uniform size among each other. In individual cases, they can be the same size as the first filter cores 14, 14'. As a rule, however, the second filter cores 15, 15' are a different size from the first filter cores 14, 14'. In particular, they may be larger than the first filter cores 14, 14'.

By means of the second mathematical morphological operation M2, as in the procedure according to FIG. 9, the detection of further objects is suppressed within areas defined by the determined contour. The suppression of the further objects takes place only up to a second maximum size of the further objects. This size is determined by the size of the second filter cores 15, 15'.

Thus, by means of the second mathematical morphological operation M2, those interferences are filtered out in which the laser beam 9 has been reflected on the container 6 or on the harness 5 in such a way that it has not been reflected directly back to the laser scanner 8 but has only been reflected back to the laser scanner 8 after further reflection or scattering on another object. The current result—at least generally speaking—in particular does not contain any incorrectly detected apparent objects which can only have arisen as a result of reflections on the container 6 or on the harness 5.

However, due to the fact that sequence of erosion and dilatation in the context of the second mathematical morphological operation M2 is inverse to the sequence of erosion and dilatation in the context of the first mathematical morphological operation M1, the second mathematical morphological operation M2 only acts within the contour which was determined in the context of the first mathematical morphological operation M1.

The evaluation facility 11 transmits its results to the control facility 16 of the container crane in a step S15. Step S15 corresponds to step S8 of FIG. 9.

Other procedures are also possible. Examples of such procedures are vectorization or edge detection, so-called snakes, region labeling, contour extraction and others.

In summary, the present invention thus relates to the following facts:

A container crane has a trolley 4 which can be moved on a cross-member 3 of a gantry 1 of the container crane. A harness 5 for picking up and setting down a container 6 and at least one laser scanner 8 are arranged on the trolley 4. By means of the laser scanner 8, a depth image B is captured which, as a function of a first and a second angle $\alpha$, $\beta$, in each case indicates the distance a of object points 10 detected by the laser scanner 8 by means of a laser beam 9. The captured depth image B is evaluated such that, based on the object points 10, objects are detected, and the locations thereof are determined. The objects comprise the harness 5 and/or a container 6 picked up by the harness 5, and further objects 7, 12, 13. Based on the detected object points 10, the contour of the harness 5 and/or of the container 6 picked up by the harness 5 is determined, and detection of the further objects 7, 12, 13 within areas defined by the determined contour is suppressed. A control facility 16 of the container crane takes the detected objects and the locations thereof into account in the context of controlling the container crane.

The present invention has many advantages. In particular, in almost all cases, it leads to a reliable determination of the harness 5 and the container 6 and, furthermore, to an almost complete suppression of reflections. This applies even if, for example, Interferences occur due to rain or snowfall, or increased reflections occur, for example, due to a painted or rain-soaked container wall. Manual intervention by an operator is scarcely necessary. A limitation of the measuring range to areas in which the harness 5 and the container 6 are definitely not located can be avoided. This is particularly advantageous because the area in which the harness 5 and/or the container 6 can be located is relatively large due to possible so-called skewing (i.e. twisting of the harness 5 and/or the container 6 about the vertical axis).

Although the invention has been illustrated and described in more detail by the preferred exemplary embodiment, the invention is not limited by the disclosed examples, and other variations may be derived therefrom by a person skilled in the art without departing from the scope of the invention.

What is claimed is:

1. A method for operating a container crane which includes a trolley movable on a cross-member of a gantry of the container crane, a harness for picking up and setting down a container arranged on the trolley, and a laser scanner arranged on the trolley, said method comprising the steps of:
   a) capturing with the laser scanner a depth image as a function of first and second angles that respectively indicate a distance of object points detected by a laser beam of the laser scanner;
   b) evaluating with an evaluation facility the captured depth image to enable, based on the object points, detection of objects and determination of locations of the detected objects, with the objects comprising the harness and/or the container picked up by the harness and further objects;
   c) determining a contour of the harness and/or the container picked up by the harness based on the detected object points;
   d) suppressing detection of the further objects within areas defined by the determined contour; and
   e) controlling the container crane with a control facility of the container crane by taking the detected objects and the locations of the detected objects into account.

2. The method of claim 1, further comprising subjecting the captured depth image or an image derived therefrom to a first mathematical morphological operation to filter out objects having a size beneath a first maximum size in the captured depth image or the image derived therefrom, wherein the determination of the contour of the harness and/or the container picked up by the harness is executed based on the captured depth image or the image derived therefrom subjected to the first mathematical morphological operation.

3. The method of claim 2, wherein the first mathematical morphological operation is a morphological dilatation and a morphological erosion following the morphological dilatation or a morphological erosion and a morphological dilatation following the morphological erosion, and further comprising using first filter cores of a same size for the morphological dilatation and the morphological erosion.

4. The method of claim 3, wherein the detection of the further objects within areas defined by the determined contour is suppressed by subjecting the captured depth image or the image derived therefrom subjected to the first mathematical morphological operation to a second mathematical morphological operation, and filtering out objects having a size below a second maximum size in the captured depth image or an image derived therefrom subjected to the first mathematical morphological operation.

5. The method of claim 4, wherein the second mathematical morphological operation is a morphological dilatation and a morphological erosion following the morphological dilatation or a morphological erosion and a morphological dilatation following the morphological erosion, and further comprising using second filter cores of a same size for the morphological dilatation and the morphological erosion of the second mathematical morphological operation, with a sequence of the morphological erosion and the morphological dilatation of the second mathematical morphological operation being inverse to a sequence of the morphological erosion and the morphological dilatation of the first mathematical morphological operation.

6. The method of claim 5, wherein the second filter cores have a size which is different than a size of the first filter cores.

7. The method of claim 5, wherein the second filter cores have a size which is larger than a size of the first filter cores.

8. The method of claim 1, wherein the steps a) to e) are executed while it is raining or snowing in a vicinity of the container crane.

9. A container crane, comprising:
- a gantry including a cross-member;
- a trolley movable on the cross-member of the gantry;
- a harness for picking up and setting down a container arranged on the trolley;
- a laser scanner arranged on the trolley and configured to capture a depth image as a function of first and second angles respectively indicating a distance of object points detected by a laser beam of the laser scanner;
- an evaluation facility configured to evaluate the captured depth image, and based on the object points, to detect objects and to determine locations of the detected objects, with the objects comprising the harness and/or the container picked up by the harness and further objects, said evaluation facility configured to determine a contour of the harness and/or of the container picked up by the harness based on the object points, and to suppress the detection of the further objects within areas defined by the determined contour; and
- a control facility configured to control the container crane by taking into account the detected objects and the locations of the detected objects.

10. The container crane of claim 9, wherein the evaluation facility is configured to subject the captured depth image or an image derived therefrom to a first mathematical morphological operation, such that in the captured depth image or the image derived therefrom objects having a size below a first maximum size are filtered out, and to determine the contour of the harness and/or the container picked up by the harness on the basis of the captured depth image or an image derived therefrom subjected to the first morphological operation.

11. The container crane of claim 10, wherein the first mathematical morphological operation is a morphological dilatation and a morphological erosion following the morphological dilatation or a morphological erosion and a morphological dilatation following the morphological erosion, with first filter cores of a same size being used for the morphological dilatation as well as for the morphological erosion.

12. The container crane of claim 11, wherein the evaluation facility is configured to suppress the detection of the further objects within areas defined by the determined contour by subjecting the captured depth image or the image derived therefrom subjected to the first mathematical morphological operation to a second mathematical morphological operation, such that objects having a size below a second maximum size are filtered out in the captured depth image or the image derived therefrom subjected to the first mathematical morphological operation.

13. The container crane of claim 12, wherein the second mathematical morphological operation is a morphological dilatation and a morphological erosion following the morphological dilatation or a morphological erosion and a morphological dilatation following the morphological erosion, with second filter cores of a same size being used for the morphological dilatation and for the morphological erosion of the second mathematical morphological operation, wherein a sequence of the morphological erosion and the morphological dilatation in the second mathematical morphological operation is inverse to a sequence of the morphological erosion and the morphological dilatation in the first mathematical morphological operation.

14. The container crane of claim 13, wherein the second filter cores have a size which different than a size of the first filter cores.

15. The container crane of claim 2, wherein the second filter cores have a size which is larger than a size of the first filter cores.

* * * * *

UNITED STATES PATENT AND TRADEMARK OFFICE
CERTIFICATE OF CORRECTION

PATENT NO. : 11,279,597 B2
APPLICATION NO. : 17/290609
DATED : March 22, 2022
INVENTOR(S) : Axel Walthelm and Fabricio De Carvalho Ferreira It is certified that error appears in the above-identified patent and that said Letters Patent is hereby corrected as shown below:

In the Claims
In Column 14, Claim 14, Lines 33 replace "which different" with --which is different--.
In Column 14, Claim 15, Lines 35 replace "claim 2" with --claim 13--.

Signed and Sealed this
Seventh Day of June, 2022

Katherine Kelly Vidal
Director of the United States Patent and Trademark Office